United States Patent
Egami et al.

(10) Patent No.: US 7,443,117 B2
(45) Date of Patent: Oct. 28, 2008

(54) CONTROL APPARATUS FOR ELECTRIC VEHICLES

(75) Inventors: Tsuneyuki Egami, Gamagori (JP); Keiichi Kawakami, Anjo (JP); Takashi Ogawa, Kariya (JP)

(73) Assignee: Denso Corporation (JP)

( * ) Notice: Subject to any disclaimer, the term of this patent is extended or adjusted under 35 U.S.C. 154(b) by 114 days.

(21) Appl. No.: 11/707,903

(22) Filed: Feb. 20, 2007

(65) Prior Publication Data

US 2007/0229009 A1 Oct. 4, 2007

(30) Foreign Application Priority Data

Mar. 29, 2006 (JP) ............................. 2006-089713
Nov. 15, 2006 (JP) ............................. 2006-309076

(51) Int. Cl.
*H02P 6/00* (2006.01)
*H02P 7/00* (2006.01)

(52) U.S. Cl. ........................ 318/139; 318/149; 318/151; 323/16; 323/17

(58) Field of Classification Search .................. 318/139, 318/376, 432, 471, 717, 811, 149, 151; 323/16, 323/17, 90
See application file for complete search history.

(56) References Cited

U.S. PATENT DOCUMENTS

| | | | | |
|---|---|---|---|---|
| 6,863,139 B2* | 3/2005 | Egami et al. | ................ | 180/53.8 |
| 7,120,037 B2* | 10/2006 | Komatsu et al. | .............. | 363/37 |
| 7,253,583 B2* | 8/2007 | Yasui et al. | .................. | 318/717 |
| 7,262,978 B2* | 8/2007 | Yamada | ........................ | 363/40 |
| 7,268,521 B1* | 9/2007 | Prakash et al. | .............. | 320/166 |
| 7,273,120 B2* | 9/2007 | Tabata | ........................ | 180/65.2 |
| 7,327,104 B2* | 2/2008 | Uenodai et al. | ............. | 318/139 |
| 7,355,869 B2* | 4/2008 | Okamura | .................... | 363/132 |
| 7,372,223 B2* | 5/2008 | Yamaguchi et al. | ........ | 310/68 B |
| 7,398,844 B2* | 7/2008 | Ishikawa et al. | ........... | 180/65.2 |
| 7,400,104 B2* | 7/2008 | Sato | ........................... | 318/376 |
| 7,405,528 B2* | 7/2008 | Ho et al. | ................ | 318/400.25 |
| 2002/0110007 A1 | 8/2002 | Kalman et al. | | |

(Continued)

FOREIGN PATENT DOCUMENTS

EP 1000796 A2 5/2000

(Continued)

OTHER PUBLICATIONS

EPO Search/Examination Report dated Jul. 18, 2007 in European Application No. 07103332.8.

(Continued)

*Primary Examiner*—Paul Ip
(74) *Attorney, Agent, or Firm*—Nixon & Vanderhye PC (57) ABSTRACT

In a hybrid vehicle control apparatus, a motor control unit executes a system voltage stabilization control, in which an input power to a MG unit is controlled to suppress variations in the system voltage. The motor control unit executes the input power control on the MG unit independently from a torque control on an AC motor so that the input power control and the torque control are stabilized. Before a smoothing capacitor is sufficiently, a conversion voltage control is executed to control an output voltage of a voltage booster converter while prohibiting the system voltage stabilization control. After the pre-charging of the capacitor, the conversion voltage control is changed to the conversion power control.

13 Claims, 7 Drawing Sheets

U.S. PATENT DOCUMENTS

| | | |
|---|---|---|
| 2004/0145338 A1 | 7/2004 | Nakamura et al. |
| 2004/0145356 A1 | 7/2004 | Kalman et al. |
| 2006/0052915 A1 | 3/2006 | Sato |
| 2006/0247829 A1 | 11/2006 | Sato |
| 2007/0145926 A1 | 6/2007 | Egami et al. |
| 2007/0145927 A1 | 6/2007 | Egami et al. |

FOREIGN PATENT DOCUMENTS

| | | |
|---|---|---|
| EP | 1 460 756 A1 | 9/2004 |
| EP | 1603224 A | 12/2005 |
| EP | 1 800 934 A2 | 6/2007 |
| EP | 1 800 936 A2 | 6/2007 |
| JP | 2003-259689 | 9/2003 |

OTHER PUBLICATIONS

Extended EP Search Report dated Mar. 12, 2007.
Extended EP Search Report dated Feb. 28, 2007.
U.S. Appl. No. 11/606,060, filed Nov. 30, 2006.
U.S. Appl. No. 11/606,061, filed Nov. 30, 2006.
U.S. Appl. No. 11/640,407, filed Dec. 18, 2007.
U.S. Appl. No. 11/643,980, filed Dec. 22, 2006.
U.S. Appl. No. 11/605,456, filed Nov. 29, 2006.
U.S. Appl. No. 11/653,848, filed Jan. 17, 2007.
U.S. Appl. No. 11/605,456, filed Nov. 2006, Egami et al.
U.S. Appl. No. 11/653,848, filed Jan. 2007, Egami et al.

* cited by examiner

CONTROL APPARATUS FOR ELECTRIC VEHICLES

CROSS REFERENCE TO RELATED APPLICATION

This application is based on and incorporates herein by reference Japanese Patent Applications No. 2006-89713 filed on Mar. 29, 2006 and No. 2006-309076 filed on Nov. 15, 2006.

This application is related to US patent applications (IPICS 99951-US and 101862-US) claiming priorities to the following Japanese Patent Applications, respectively:
No. 2005-343750 filed on Nov. 29, 2005; and
No. 2006-40272 filed on Feb. 17, 2006.

FIELD OF THE INVENTION

The present invention relates to a control apparatus for an electric vehicle including a system for converting a voltage generated by a DC power supply into a system voltage by using a voltage converter and for driving an AC motor by applying the system voltage to the AC motor through an inverter.

BACKGROUND OF THE INVENTION

As disclosed in documents such as U.S. 2006/0052915A1 (JP 2004-274945A), in an electric vehicle having AC motors mounted therein to serve as a power source of the vehicle, the AC motors are each capable of serving as a motor for driving wheels of the vehicle as well as a motor driven by an engine to generate power. As the above system, a control apparatus for the electric vehicle includes a voltage boosting converter for raising a voltage generated by a DC power supply, which is implemented by a secondary battery, to a high DC voltage appearing on a power supply line connected to the AC motors through inverters. The inverters are capable of serving as a component for converting the raised DC voltage appearing on the power supply line into an AC voltage for driving one of the AC motors as well as a component for converting the AC voltage into a DC voltage supplied back or restored to the secondary battery through the voltage boosting converter, which lowers the level of the DC voltage.

In the above system, in order to stabilize the voltage appearing on the power supply line, the voltage boosting converter controls the voltage appearing on the power supply line to a target voltage. Further, at the same time, a smoothing capacitor connected to the power supply line smoothes the voltage appearing on the power supply line.

When a relation between electric power driving one of the AC motors and electric power generated by the other AC motor considerably varies due to a change in vehicle operating state or another reason, however, voltage variations caused by a change in such relation as voltage variations of the power supply line cannot be absorbed by the voltage boosting converter and/or the smoothing capacitor. Thus, the voltage appearing on the power supply line becomes excessively high. As a result, it is likely that electronic equipment connected to the power supply line is damaged. In order to cope with this problem, there is provided a method for enhancing the effect of stabilizing the voltage appearing on the power supply line by using an improved voltage boosting converter with better performance and a smoothing capacitor with a larger capacitance. By adoption of this method, however, the voltage boosting converter with better performance and the smoothing capacitor with a larger capacitance will inevitably raise the cost of the control apparatus for an electric vehicle. Thus, demands for a system having a small size and a low cost cannot be met. The above relation between the power driving one of the AC motors and the power generated by the other AC motor is also referred to as a balance of power between the power driving one of the AC motors and the power generated by the other AC motor.

It is proposed for controlling the inverter to make a sum of energies (or balance of electric power) of the two AC motors equal to 0 at the time the connection between the DC power supply and the voltage boosting converter is cut off by using a relay in the event of a failure occurring in the DC power supply. However, this method is provided as a countermeasure to a failure occurring in the DC power supply and is capable of enhancing the effect of stabilizing the voltage appearing on the power supply line in a normal state of the power supply. In addition, even if an attempt is made to control the inverter to make the sum of energies (or the balance of power) of the two AC motors equal to 0 in a normal state, it is difficult to control the inverter to make the sum of energies (or the balance of power) of the two AC motors equal to 0 in the following cases.

In the first place, one of the AC motors is linked to a driving shaft of the electric vehicle and the other AC motor is linked to an output shaft of the internal combustion engine, that is, the two AC motors are linked to members having different operations. In the second place, the effect of a processing delay of the control executed on the inverter becomes larger, for example, during a transient in which the operating state of the electric vehicle changes. The AC motor linked to the internal combustion engine is not capable of obviating power variations caused by changes of a torque generated by the internal combustion engine. This fact makes it even more difficult to control the inverter to make the sum of energies of the two AC motors equal to 0.

SUMMARY OF THE INVENTION

It is thus an object of the present invention to improve a control apparatus for electric vehicles to be capable of stabilizing a voltage appearing on a power supply line in small size and low cost.

According to one aspect, a control apparatus for an electric vehicle comprises a conversion unit that converts a voltage supplied by a DC power supply into a system voltage appearing on a power supply line, and an MG unit that includes an inverter connected to the power supply line and drives an AC motor. The control apparatus controls a torque of the AC motor and an input electric power to the MG unit independently from each other, executes a system voltage stabilization control to control the input electric power to the MG unit so as to suppress variation in the system voltage by sending a command value for controlling the input electric power, executes a conversion power control to control a conversion power, which is an input electric power or an output power of the converter means from the converter means, and executes a conversion voltage control to control the voltage. The control apparatus selects execution of either the conversion power control or the conversion voltage control, and inhibits execution of the system voltage stabilization control when the conversion voltage control is selected.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
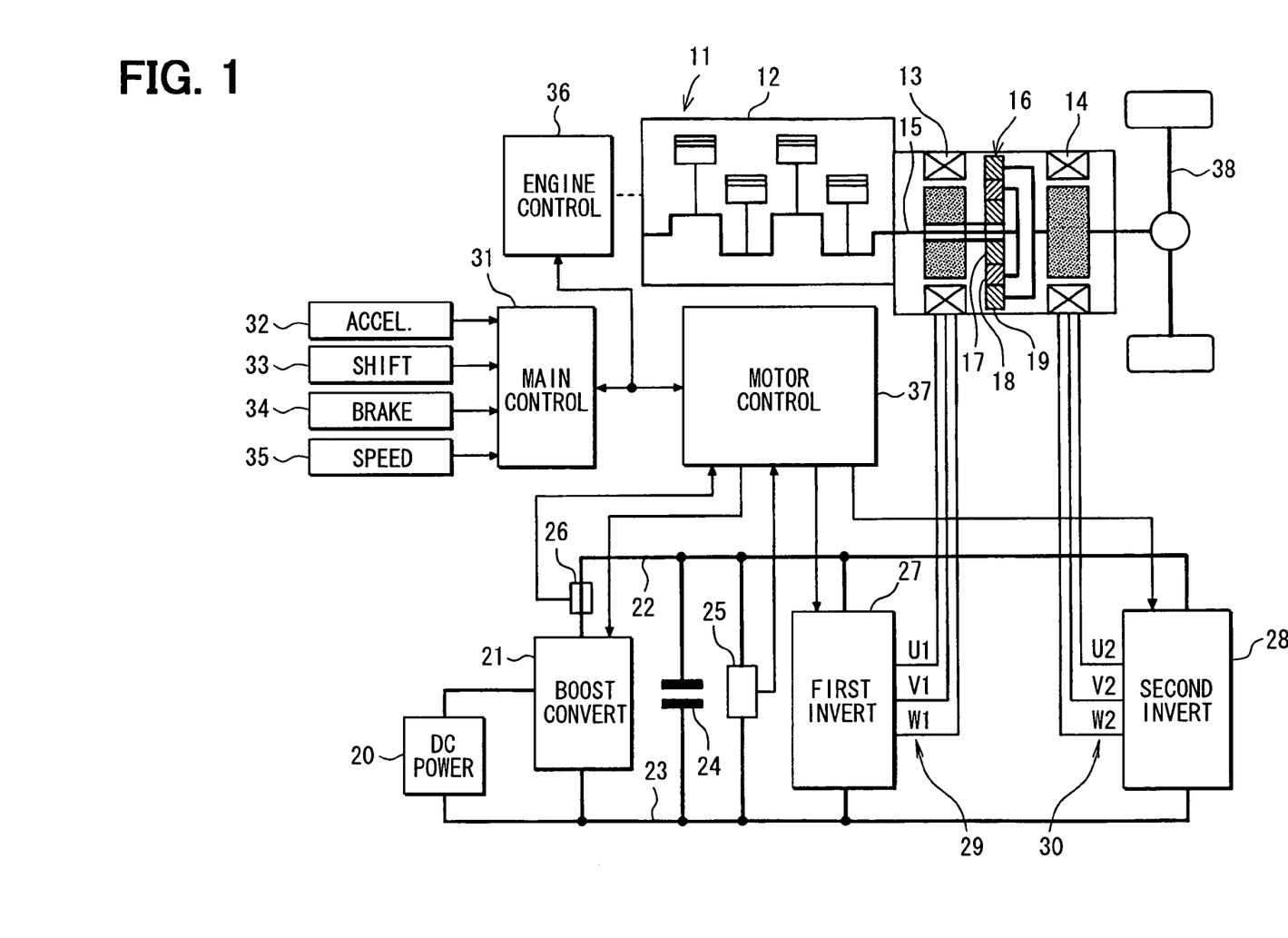
FIG. 1 is a block diagram showing a driving system for an electric vehicle in accordance with an embodiment of the present invention.

Referring first to FIG. 1, an electric vehicle 11 has an internal combustion engine 12 in addition to a first AC motor 13 and a second AC motor 14. Thus, the electric vehicle 11 is an engine/motor hybrid vehicle. The engine 12 and the second AC motor 14 are employed as a drive power source for driving the electric vehicle 11. Power generated by a crankshaft 15 of the engine 12 is divided into two paths by a planetary gear set 16. The planetary gear set 16 includes a sun gear 17, a planetary gear 18 and a ring gear 19. The sun gear 17 rotates at its radial center. The planetary gear 18 rotates along a circumference external to the sun gear 17 while revolving around its radial center. The ring gear 19 rotates along a circumference external to the planetary gear 18. The planetary gear 18 is linked to the crankshaft 15 of the engine 12 through a carrier not shown in the figure. On the other hand, the ring gear 19 is linked to a rotation shaft of the second AC motor 14. The sun gear 17 is linked to the first AC motor 13.

A secondary battery serving as a DC power supply 20 is connected to a voltage boosting converter 21 serving as a power conversion means. The voltage boosting converter 21 is a component having a function for increasing a DC voltage output by the DC power supply 20 in order to generate a DC system voltage supplied between a power supply line 22 and a ground line 23 as well as a function for decreasing the system voltage in order to return or restore power to the DC power supply 20. A smoothing capacitor 24 for smoothing the system voltage and a voltage sensor 25 serving as a voltage detection means for detecting a value of the system voltage are connected between the power supply line 22 and the ground line 23. A current sensor 26 serving as a current detection means is placed on the power supply line 22 as a means for detecting a current flowing through the power supply line 22.

In addition, a three-phase first inverter 27 and a three-phase second inverter 28 are also connected between the power supply line 22 and the ground line 23. The three-phase first inverter 27 and the three-phase second inverter 28 are each a three-phase inverter of a voltage control type. The three-phase first inverter 27 drives the first AC motor 13, whereas the three-phase second inverter 28 drives the second AC motor 14. The three-phase first inverter 27 and the first AC motor 13 form a first motor driving unit 29, which operates as a first MG unit 29. Similarly, the three-phase second inverter 28 and the second AC motor 14 form a second motor driving unit 30, which operates as a second MG unit 30.

A main control unit 31 is a computer for executing overall control on the electric vehicle as a whole. The main control unit 31 acquires signals output by a variety of sensors and switches in order to detect an operating state of the electric vehicle. The sensors and the switches include an accelerator sensor 32, a shift switch 33, a brake switch 34 and a vehicle speed sensor 35. The accelerator sensor 32 is a sensor for detecting an accelerator operation quantity representing an operation quantity of an acceleration pedal. The shift switch 33 is a sensor for detecting gear shift position of the electric vehicle. The gear shift position can be a parking position (P), a rear driving position (R), a neutral position (N) or a forward driving position (D). The brake switch 34 is a switch for detecting a braking operation. The vehicle speed sensor 35 is a sensor for detecting a value of the travel speed of the electric vehicle. The main control unit 31 exchanges control and data signals with an engine control unit 36 and a motor control unit 37, driving the engine control unit 36 and the motor control unit 37 to control the engine 12, the first AC motor 13 and the second AC motor 14 in accordance with the operating state of the electric vehicle. The engine control unit 36 is for controlling the operation of the engine 12, whereas the motor control unit 37 is for controlling the operations of the first AC motor 13 and the second AC motor 14.

Figure 2:
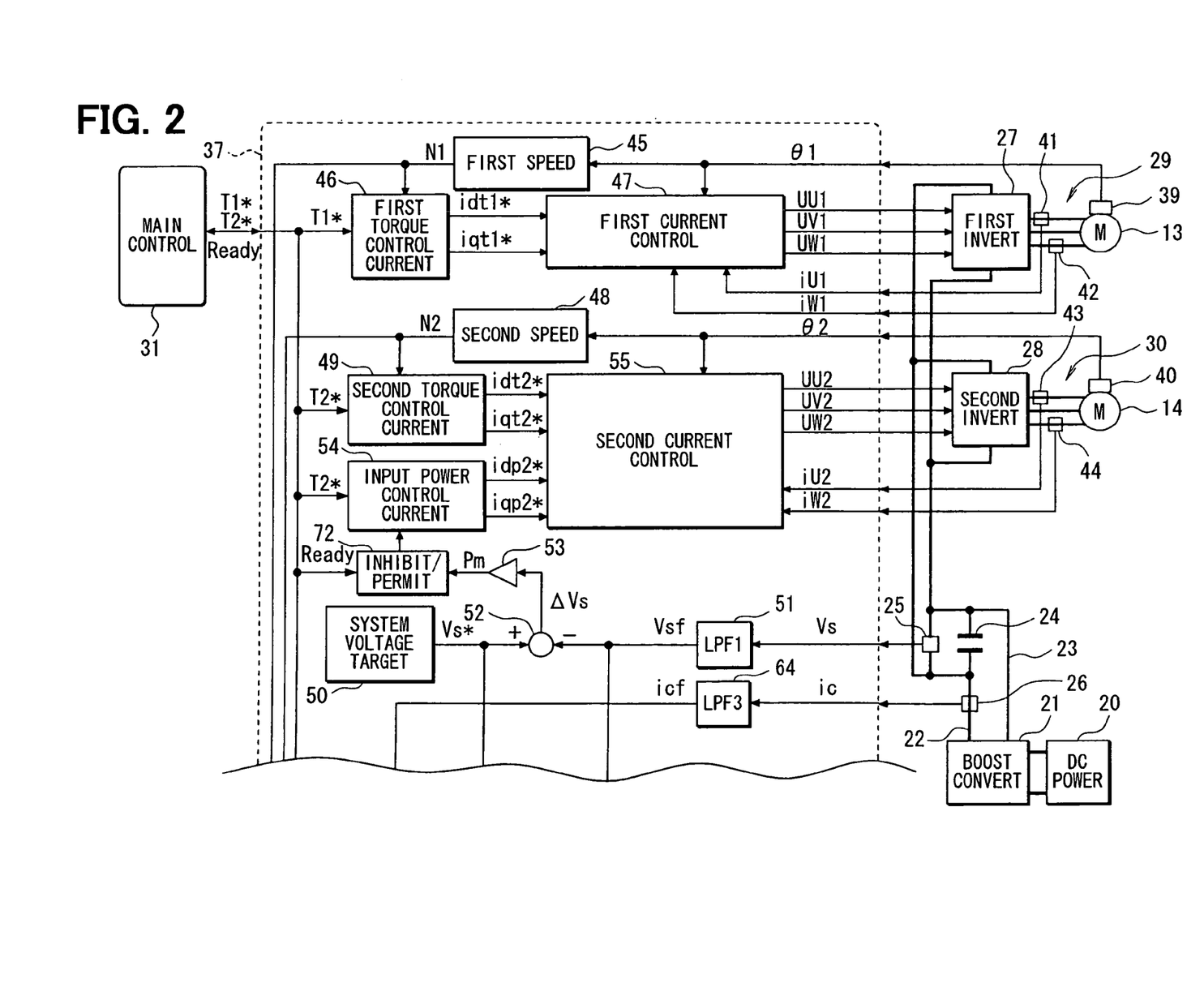
FIG. 2 is a block diagram showing one part of a control system employed in the driving system for controlling AC motors of the driving system in accordance with the embodiment.
Figure 3:
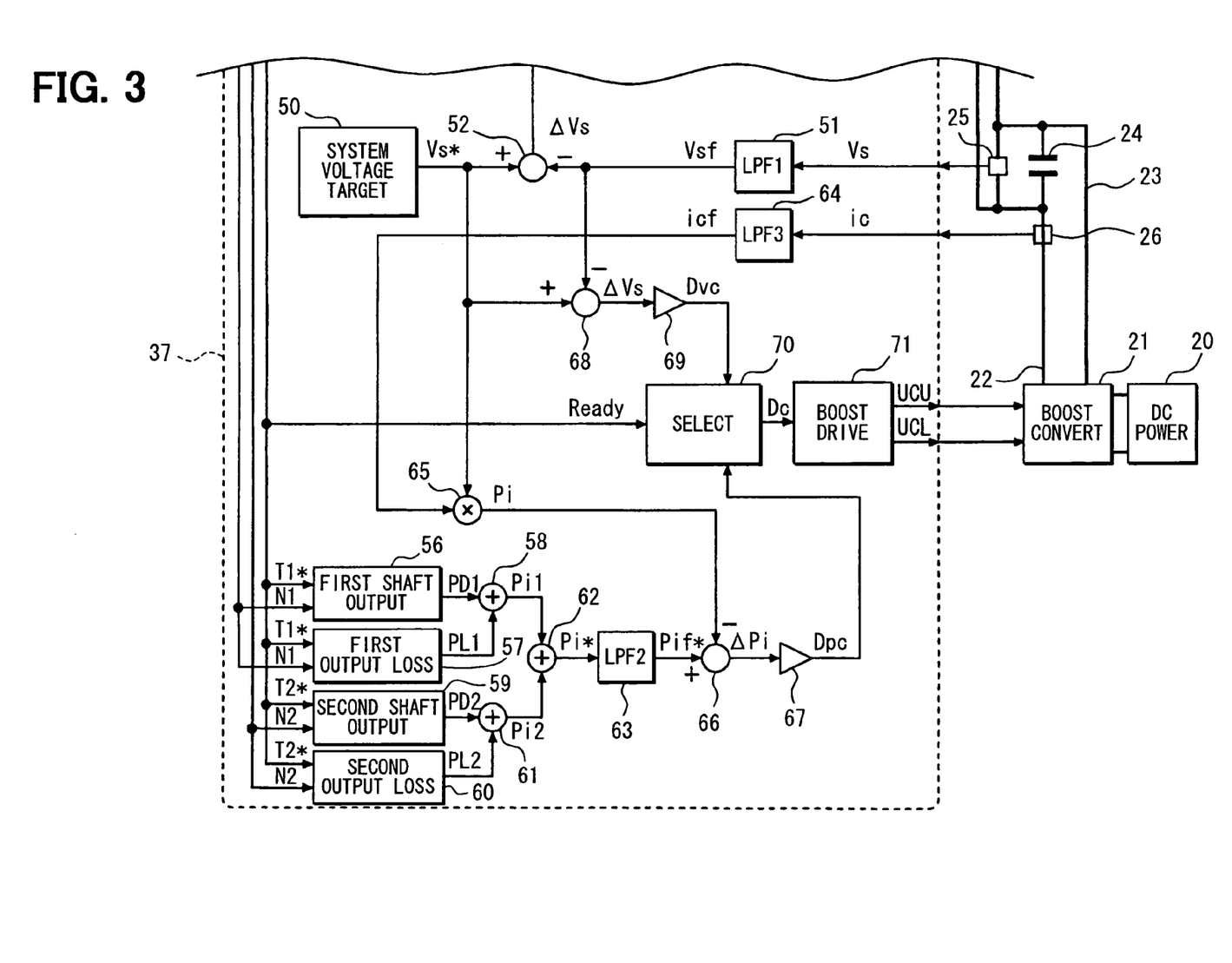
FIG. 3 is a block diagram showing the other part of the control system employed in the driving system for controlling AC motors of the driving system in accordance with the embodiment.

Next, control of the first AC motor 13 and the second AC motor 14 is described by referring to FIGS. 2 and 3. The first AC motor 13 and the second AC motor 14 are each a three-phase permanent-magnet synchronous motor having a permanent magnet in its inside. The first AC motor 13 and the second AC motor 14 have respectively rotor rotational position sensors 39 and 40 each used for detecting the rotational position of the rotor of the motor. On the basis of three-phase voltage command signals UU1, UV1 and UW1 output by the motor control unit 37, the first inverter 27 of the voltage control type converts the DC system voltage appearing on the power supply line 22 into three-phase AC voltages U1, V1 and W1 for driving the first AC motor 13. The DC system voltage appearing on the power supply line 22 is generated by the voltage boosting converter 21. A U-phase current sensor 41 is a sensor for detecting a U-phase current iU1 of the first AC motor 13, whereas a W-phase current sensor 42 is a sensor for detecting a W-phase current iW1 of the first AC motor 13.

Similarly, on the basis of three-phase voltage command signals UU2, UV2 and UW2 output by the motor control unit 37, the three-phase second inverter 28 of the voltage control type converts the DC system voltage appearing on the power supply line 22 into three-phase AC voltages U2, V2 and W2 for driving the second AC motor 14. A U-phase current sensor 43 is a sensor for detecting a U-phase current iU2 of the second AC motor 14, whereas a W-phase current sensor 44 is a sensor for detecting a W-phase current iW2 of the first AC motor 13.

It is to be noted that the first AC motor 13 and the second AC motor 14 each also function as an electric power generator, when the first AC motor 13 and the second AC motor 14 are driven by the three-phase first inverter 27 and the three-phase second inverter 28 respectively to generate a negative torque. For example, when the electric vehicle 11 is being decelerated, AC power generated by the second AC motor 14 as a deceleration energy is converted into DC power by the three-phase second inverter 28 and the DC power is accumulated back in the DC power supply 20. Normally, a portion of power of the engine 12 is transferred to the first AC motor 13 by way of the planetary gear 18, causing the first AC motor 13 to operate as a generator for generating electric power corresponding to the portion of the power of the engine 12. The electric power generated by the first AC motor 13 is supplied to the second AC motor 14, causing the second AC motor 14 to operate as a motor. The power of the engine 12 is divided into two paths by the planetary gear set 16. When a torque applied to the ring gear 19 of the planetary gear set 16 is greater than a torque required by a running operation of the electric vehicle, the first AC motor 13 functions as a motor, drawing power for the engine 12. In this case, the second AC motor 14 functions as a generator generating power to be supplied to the first AC motor 13. Thus, each of the first AC motor 13 and the second AC motor 14 operates as a motor/generator (MG).

At the start of operating the vehicle drive system (at the operation start of the main control unit 31 or the motor control unit 37), the motor control system is in a state of being shut down (motor control and the like have been halted) and almost no electric charge has been accumulated in the smoothing capacitor 24. Prior to starting the motor control, therefore, it is necessary to pre-charge the smoothing capacitor 24 to elevate the system voltage up to a target value.

Therefore, the motor control unit 37 executes a main motor control program shown in of FIG. 7 that will be described later. That is, right after the start of system operation but before the smoothing capacitor 24 has been sufficiently pre-charged, the motor control unit 37 selectively executes the conversion voltage control to control the output voltage of the voltage boosting converter 21 so that the system voltage is quickly brought into agreement with the target value. During execution of this conversion voltage control, the motor control unit 37 further prohibits the electric power command value (input power operation quantity Pm) for stabilizing the system voltage that will be described later from being output to an input electric power system (input electric power control current computation unit 54 to thereby prohibit the execution of control for stabilizing the system voltage. After the smoothing capacitor 24 has been pre-charged, a pre-charge completion signal is transmitted to the main control unit 31.

When it is so determined on the basis of the pre-charge completion signal and other signals that the motor control system may be released from the shut-down state, the main control unit 31 transmits a ready signal to the motor control unit 37.

Upon receipt of the ready signal, the motor control unit 37 releases the motor control system from the shut-down state, executes the motor control, discontinues the conversion voltage control, and changes the control over to the conversion power control. Thus, the motor control unit 37 controls the output power of the voltage boosting converter 21 so that the output voltage of the voltage boosting converter 21 is brought into agreement with the command value.

In the motor control, the control unit 37 executes the torque control for controlling the torque of the first AC motor 13, the torque control for controlling the torque of the second AC motor 14, and the system voltage stabilization control for controlling the input power of the second AC motor 30 so that variation in the system voltage may be suppressed. The control unit 37 executes the torque control for the second AC motor 14 and the input power control for the second MG unit 30 independently from each other.

The motor control unit 37 executes the motor control (torque control, system voltage stabilization control), the conversion voltage control and the conversion power control as described below.

(Motor Control)

The motor control unit 37 executes motor control (torque control, MG power control and system voltage stabilization control) as well as the conversion voltage control and conversion power control.

When the smoothing capacitor 24 has been sufficiently pre-charged, that is, pre-charging the smoothing capacitor 24 has been completed, after the start of system operation, the motor control unit 37 releases the motor control system from the shut-down state and executes the motor control (torque control, system voltage stabilization control).

In execution of torque control on the first AC motor 13, the motor control unit 37 generates the three-phase voltage command signals UU1, UV1 and UW1 by a sinusoidal-waveform PWM control method on the basis of a torque command value T1* output by the main control unit 31, the U-phase current iU1 and W-phase current iW1 of the first AC motor 13 as well as the rotor rotational position θ1 of the first AC motor 13 as described below. The U-phase current iU1 and the W-phase current iW1 are signals output by the current sensors 41 and 42 respectively, whereas the rotor rotational position θ1 is a signal output by the rotor rotational position sensor 39.

The signal output by the rotor rotational position sensor 39 as a signal representing the rotor rotational position θ1 of the first AC motor 13 is supplied to a first rotation speed computation unit 45 for computing a first rotation speed N1 of the first AC motor 13. Then, in order to apply current feedback control to each of a d-axis current id1 and a q-axis current iq1 independently of each other in a d-q coordinate system set as a rotational coordinate system of the rotor of the first AC motor 13, a first torque control current computation unit 46 computes a torque control current vector it1* representing a d-axis torque control current idt1* and a q-axis torque control current iqt1* by using typically map data or a mathematical equation as a vector according to the torque command value T1* and rotation speed N1 of the first AC motor 13.

Subsequently, a first current vector control unit 47 computes an actual current vector i1 (d-axis current id1 and the q-axis current iq1) on the basis of the U-phase current iU1 and W-phase current iW1 of the first AC motor 13 as well as the rotor rotational position θ1 of the first AC motor 13 as described below. As described above, the U-phase current iU1 and the W-phase current iW1 are signals output by the current sensors 41 and 42 respectively, whereas the rotor rotational position θ1 is the signal output by the rotor rotational position sensor 39. Then, the first current vector control unit 47 computes a d-axis command voltage Vd1* by execution of P-I control for reducing a difference Δid1 between the d-axis torque control current idt1* and an actual d-axis current id1, and computes a q-axis command voltage Vq1* by execution of proportional-and-integral (P-I) control for reducing a difference Δiq1 between the q-axis torque control current iqt1* and an actual q-axis motor detection current iq1. Finally, the first current vector control unit 47 converts the d-axis command voltage Vd1* and the q-axis command voltage Vq1* into the three-phase PWM command signals UU1, UV1 and UW1, outputting the three-phase PWM command signals UU1, UV1 and UW1 to the three-phase first inverter 27.

Thus, the torque control for controlling the torque of the first AC motor 13 is executed to realize the torque command value T1* output by the main control unit 31.

In execution of torque control on the second AC motor 14, on the other hand, the motor control unit 37 generates the three-phase voltage command signals UU2, UV2 and UW2 by the sinusoidal-waveform PWM control method on the basis of a torque command value T2* output by the main control unit 31, the U-phase current iU2 and W-phase current iW2 of the second AC motor 14 as well as the rotor rotational position θ2 of the second AC motor 14. As described below, the U-phase current iU1 and the W-phase current iW1 are signals output by the current sensors 43 and 44 respectively, whereas the rotor rotational position θ1 is a signal output by the rotor rotational position sensor 40.

At this time, control of stabilizing the system voltage is executed in order to suppress variations in the system voltage while sustaining the torque generated by the second AC motor 14 at a constant value (torque command value T2*) by adjusting an input power to the second AC motor 14 through adjustment of a current vector so as to change only the input power (or reactive power) different from the power required for generation of the torque of the second AC motor 14.

Specifically, first of all, the signal output by the rotor rotational position sensor 40 as a signal representing the rotor rotational position θ2 of the second AC motor 14 is supplied to a second rotation speed computation unit 48 for computing a rotation speed N2 of the second AC motor 14. Then, in order to apply current feedback control to each of a d-axis current id2 and a q-axis current iq2 independently of each other in a d-q coordinate system set as a rotational coordinate system of the rotor of the second AC motor 14, a second torque control current computation unit 49 computes a torque control current vector it2* representing a d-axis torque control current idt2* and a q-axis torque control current iqt2* by using typically map data or a mathematical equation as a vector according to a torque command value T2* and rotation speed N2 of the second AC motor 14.

Then, a system voltage target value computation unit 50 serving as a target value computation means computes a target value Vs* of the system voltage, whereas the voltage sensor 25 supplies a detection value Vs of the system voltage to a first low pass filter 51 serving as a first low-frequency component passing means for carrying out a low pass filtering process to pass only components included in the detection value Vs of the system voltage as components each having a low frequency. Subsequently, a subtractor 52 computes a difference ΔVs between the target value Vs* of the system voltage and a detection value Vsf output by the low pass filtering process as the detection value of the system voltage, supplying the difference ΔVs to the a P-I controller 53 serving as a power operation quantity computation means for computing an input power operation quantity Pm of the second AC motor 14 as a quantity that reduces the difference ΔVs between the target value Vs* of the system voltage and the detection value Vsf output by the low pass filtering process as the detection value of the system voltage by execution of P-I control.

Figure 4:
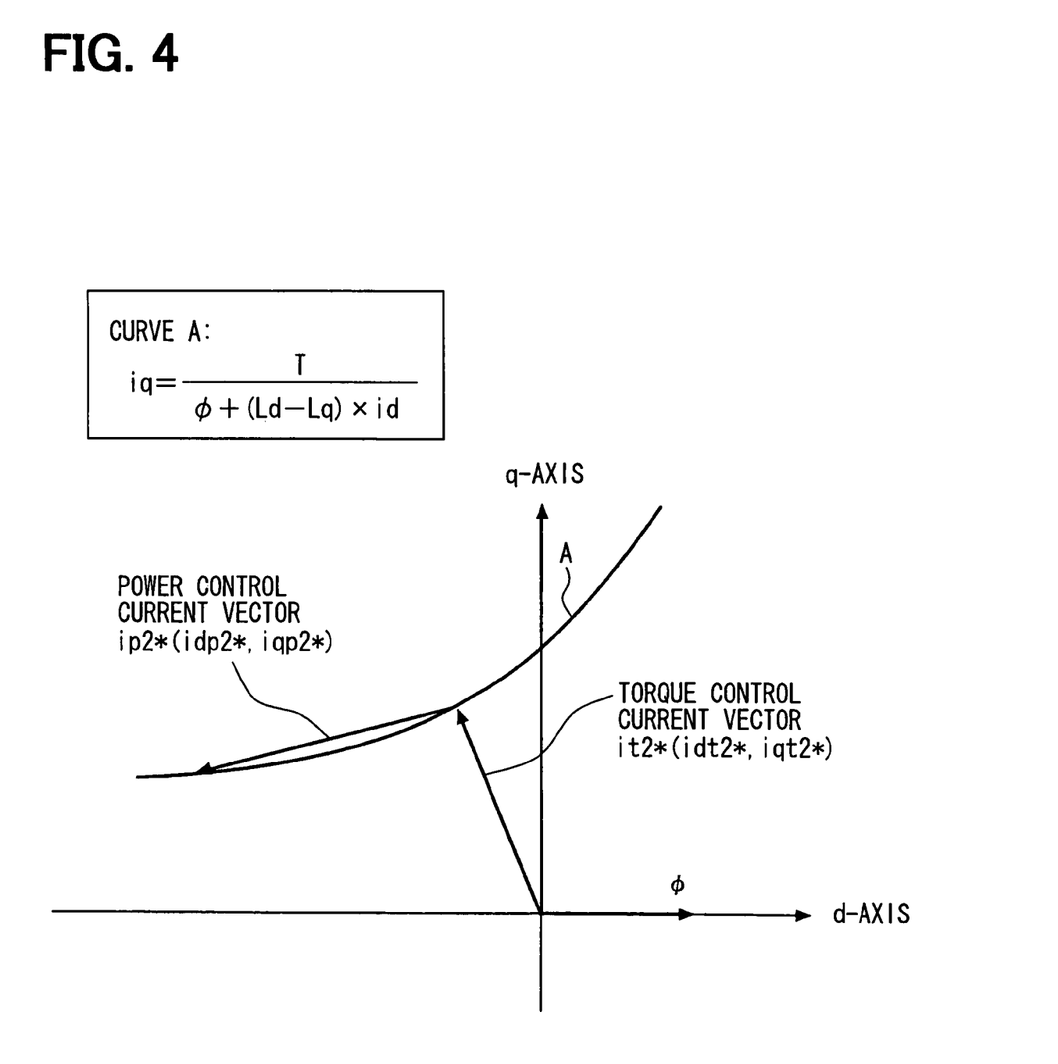
FIG. 4 is a graph showing a characteristic of a current vector used for computing a command current vector in the embodiment.

The input electric power operation amount Pm is input to an inhibit/permit gate 72. Upon receipt of a ready signal from the main control unit 31, the input electric power operation amount Pm is permitted to be output to an input electric power control current computation unit 54. Upon inputting the input electric power operation amount Pm to the input electric power control current computation unit 54, a command current vector ip2* (d-axis command current idp2*, q-axis command current iqp2*) for controlling the input electric power is computed in a manner as described below to vary the reactive power that does not contribute to producing the torque of the second AC motor 14 by the input electric power operation amount Pm as shown in FIG. 4.

First, the d-axis command current idp2* for controlling the input electric power which is dependent upon the input electric power operation amount Pm and upon the command current vector it2* (d-axis command current idt2*, q-axis command current iqt2*) for controlling the torque, is computed by using a map or a numerical formula, and the q-axis command current iqp2* for controlling the input electric power is operated by using the d-axis command current idp2* for controlling the input electric power.

$$iqp2^* = [(Ld-Lq) \times idp2^* \times iqt2^*]/[(Ld-Lq) \times (idp2^* + idt2^*) + \phi]$$

where φ is a magnetic flux linkage, Ld is a d-axis inductance, and Lq is a q-axis inductance, which are device constants of the AC motor 14.

Thus, the command current vector ip2* (d-axis command current idp2*, q-axis command current iqp2*) for controlling the input electric power is computed to vary the input electric power (reactive power) to the second AC motor 14 by the input electric power operation amount Pm while maintaining the torque of the second AC motor 14 (torque command value T2*) constant.

Figure 5:
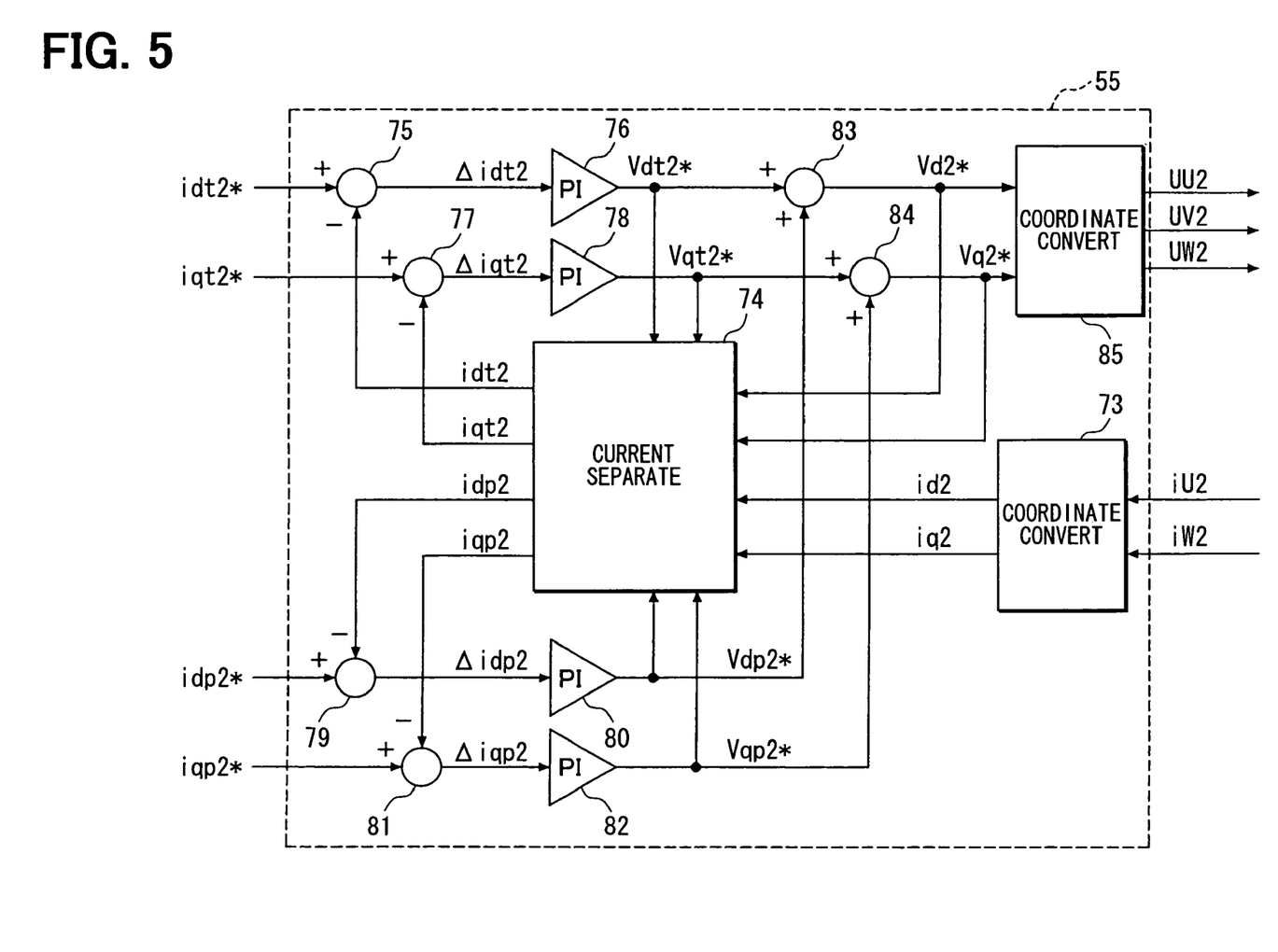
FIG. 5 is a block diagram showing a second current control part in the embodiment.

Thereafter, the command current vector it2* (d-axis command current idt2*, q-axis command current iqt2*) for controlling the torque and the command current vector ip2* (d-axis command current idp2*, q-axis command current iqp2*) for controlling the input electric power, are input to a second current control unit 55 (current control means) shown in FIG. 5. In this second current control unit 55, a coordinate converter unit 73 computes a motor detection current vector i2 (d-axis motor detection current id2, q-axis motor detection current iq2) which is a detected value of current actually flowing into the second AC motor 14 based on the currents iU2 and iW2 of U-phase and W-phase of the second AC motor 14 (output signals of the current sensors 43 and 44) and on the rotational position θ2 of the rotor of the second AC motor 14 (output signal of the rotor rotational position sensor 40).

Thereafter, in order to control the torque of the second AC motor 14 and to control the electric power input to the second AC motor 14 independently from each other, a current separation unit 74 (current separation means) separates the detected motor current vector i2 (d-axis detected motor current id2, q-axis detected motor current iq2) into a detected current vector it2 (d-axis detected current idt2, q-axis detected current iqt2) for controlling the torque related to the torque control and a detected current vector ip2 (d-axis detected current idp2, q-axis detected current iqp2) for controlling the input electric power related to the input electric power control.

Figure 6:
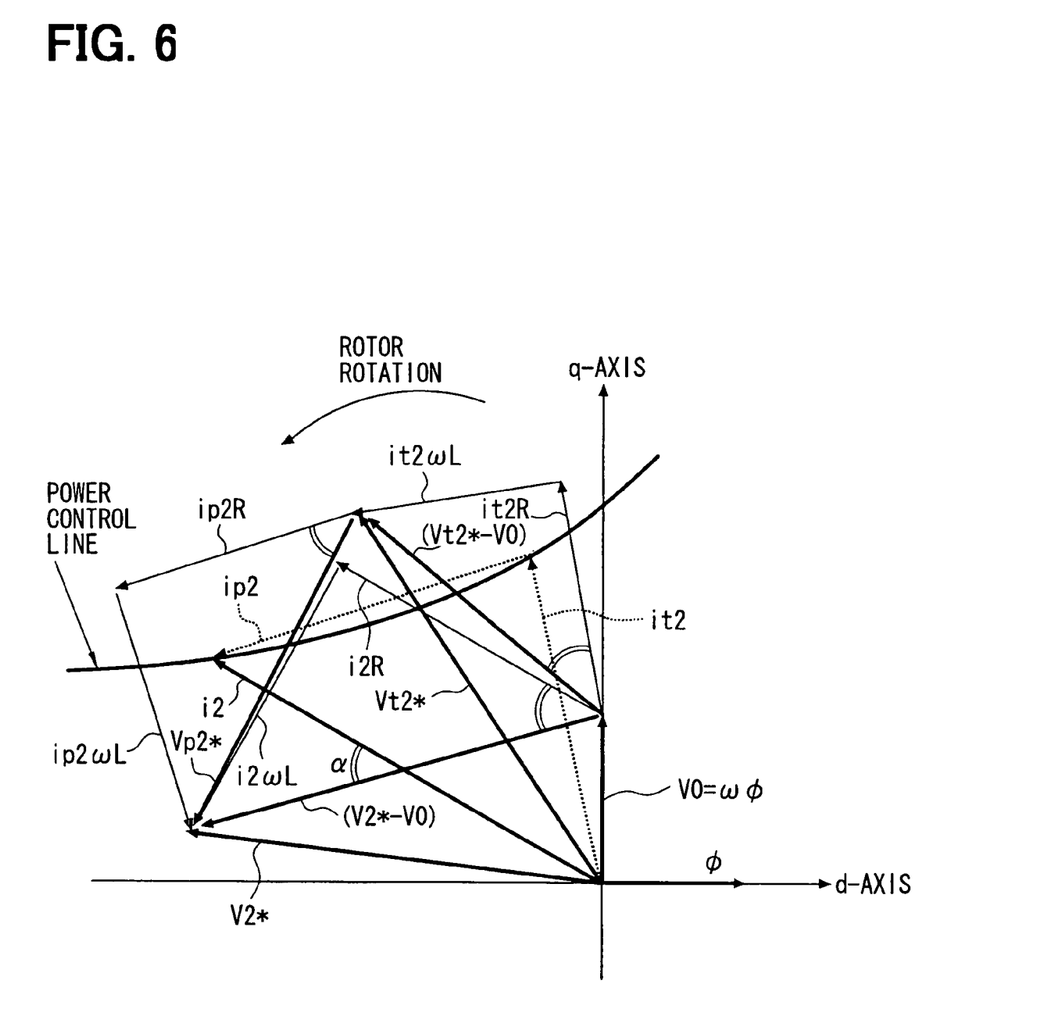
FIG. 6 is a graph showing method of calculating detected current vectors for torque control and input power control in the embodiment.

FIG. 6 shows a method of separating the detected motor current vector i2 into the detected current vector it2 for controlling the torque and the detected current vector ip2 for controlling the input electric power. Here, ω denotes an electric angular velocity, L denotes an inductance, R denotes an armature winding resistance and φ denotes an interlinking magnetic flux. The motor command voltage vector V2* is a voltage vector obtained by adding a command voltage vector Vp2* for controlling the input electric power to the command voltage vector Vt2 for controlling the torque, and the voltage vector V0 is a voltage vector computed by multiplying the electric angular velocity ω by the magnetic flux linkage φ.

At a moment when the phase difference is α between the voltage vector (V2*−V0) and the current vector i2, and R and ωL are not almost changing, a triangle A formed by the three current vectors i2, it2 and ip2 is similar to a triangle B formed by the three voltage vectors (V2*−V0), (Vt2*−V0) and Vp2*. Therefore, the similarity ratio R of the triangle A by the current vectors to the triangle B by the voltage vectors becomes a value obtained by dividing the length of the current vector i2 by the length of the voltage vector (V2*−V0), $$R = |i2|/|V2^*-V0|$$

That is, the triangle A formed by the three current vectors i2, it2 and ip2 is a triangle which works to advance the angle by α in the direction of each side of the triangle B formed by the three voltage vectors (V2*−V0), (Vt2*−V0) and Vp2*, and to lengthen each side by R times.

It is, therefore, allowed to compute the detected current vector it2 (d-axis detected current idt2, q-axis detected current iqt2) for controlling the torque by computing a vector that advances the angle by α in the direction of the voltage vector (Vt2*−V0) and lengthens the length thereof by R times. It is, further, allowed to compute the detected current vector ip2 (d-axis detected current idp2, q-axis detected current iqp2) for controlling the input electric power by finding a vector that advances the angle by α in the direction of the voltage vector Vp2* and lengthens the length thereof by R times.

After the detected motor current vector i2 is separated into the detected current vector it2 for controlling the torque and the detected current vector ip2 for controlling the input electric power, a subtractor 75 computes a difference Δidt2 between the d-axis command current idt2* for controlling the torque and the d-axis detected current idt2 as shown in FIG. 5. The difference Δidt2 is input to a P-I controller 76 which computes a d-axis command voltage Vdt2* for controlling the torque by the P-I control so that the difference Δidt2 decreases. Further, a subtractor 77 computes a difference Δiqt2 between the q-axis command current iqt2* for controlling the torque and the q-axis detected current iqt2, and the difference Δiqt2 is input to a P-I controller 78 which computes a q-axis command voltage Vqt2* for controlling the torque by the P-I control so that the difference Δiqt2 decreases. Thus, a command voltage vector Vt2* (d-axis command voltage Vdt2*, q-axis command voltage Vqt2*) for controlling the torque is computed to decrease the difference between the command current vector it2* for controlling the torque and the detected current vector it2.

Further, a subtractor 79 computes a difference Δidp2 between the d-axis command current idp2* for controlling the input electric power and the d-axis detected current idp2, and the difference Δidp2 is input to a P-I controller 80 which computes a d-axis command voltage Vdp2* for controlling the input electric power by the P-I control so that the difference Δidp2 decreases. Further, a subtractor 81 computes a difference Δiqp2 between the q-axis command current iqp2* for controlling the input electric power and the q-axis detected current iqp2, and the difference Δiqp2 is input to a P-I controller 82 which computes a q-axis command voltage Vqp2* for controlling the input electric power by the P-I control so that the difference Δiqp2 decreases. Thus, a command voltage vector Vp2* (d-axis command voltage Vdp2*, q-axis command voltage Vqp2*) for controlling the input power is computed to decrease the difference between the command current vector ip2* for controlling the input electric power and the detected current vector ip2.

As described above, the command voltage vector Vt2* (d-axis command voltage Vdt2*, q-axis command voltage Vqt2*) for controlling the torque and the command voltage vector Vp2* (d-axis command voltage Vdp2*, q-axis command voltage Vqp2*) for controlling the input electric power, are independently computed. Thereafter, an adder 83 adds the d-axis command voltage Vdp2* for controlling the input electric power to the d-axis command voltage Vdt2* for controlling the torque to compute a final d-axis motor command voltage Vd2*, while an adder 84 adds the q-axis command voltage Vqp2* for controlling the input electric power to the q-axis command voltage Vqt2* for controlling the torque to compute a final motor q-axis command voltage vector Vq2*. Thus, the motor command voltage vector V2* (d-axis motor command voltage Vd2, q-axis motor command voltage Vq2*) is determined. V2* (d-axis motor command voltage Vd2, q-axis motor command voltage Vq2*) is converted through a coordinate converter unit 85 into three-phase voltage command signals UU2, UV2 and UW2, which are output to a second inverter 28 of these three-phase voltage command signals UU2, UV2 and UW2.

As described above, the system voltage stabilization control is executed to suppress variation in the system voltage by executing the torque control to control the torque of the second AC motor 14 so as to realize the torque command value T2* output from the main control unit 31, by executing the input electric power control to vary the electric power (reactive power) input to the second AC motor 14 by the input electric power operation amount Pm while maintaining the torque of the second AC motor 14 (torque command value T2*) constant, and by so controlling the electric power input to the second MG unit 30 (second AC motor 14) that the difference ΔVs decreases between the target value Vs* of the system voltage and the detected value Vsf. In this case, the P-I controller 53, the input electric power control current computation unit 54 and the like units operates as system voltage control means.

(Conversion Voltage Control)

Right after the start of system operation but before completion of pre-charging the smoothing capacitor 24, the motor control unit 37 executes the conversion voltage control to control the output voltage of the voltage boosting converter 21 so as to decrease the difference ΔVs between the target value Vs* and the detection value Vsf of the system voltage.

Specifically referring to FIG. 3, the system voltage target value computation unit 50 computes the target value Vs* of the system voltage, the system voltage Vs detected by the voltage sensor 25 is input to the first low pass filter 51 to execute the low pass filtering process permitting the passage of components in a low-frequency region only of the detected system voltage Vs. Thereafter, a subtractor 68 computes the difference ΔVs between the target value Vs* of the system voltage and the detection value Vsf of the system voltage after being subjected to the low pass filtering. The difference ΔVs is input to a P-I controller 69 (conversion voltage control quantity computing means), and a current duty ratio Dvc of a switching element that is not shown in the voltage boosting converter 21 is computed by P-I control so as to decrease the difference ΔVs between the target value Vs* of the system voltage and the detection value Vsf of the system voltage after being subjected to the low pass filtering.

The current duty ratio Dvc for voltage control and the current duty ratio Dpc for power control that will be described later are input to a voltage boosting drive selection and computation unit 70, which operates as a selector means. After the start of the system, the voltage boosting drive selection and computation unit 70 determines whether the ready signal from the main control unit 31 has been received. When it is determined that the ready signal has not been received, it is so determined that the smoothing capacitor 24 has not yet been sufficiently pre-charged, and the current duty ratio Dvc for voltage control is selected as a current duty ratio Dc of the switching element in the voltage boosting converter 21 to thereby execute the conversion voltage control by the voltage boosting converter 21.

$$Dc=Dvc$$

Thereafter, a voltage boosting drive signal computation unit 71 computes voltage boosting drive signals UCU, UCL based on the current duty ratio Dc (=Dvc) for power control, and the voltage boosting drive signals UCU and UCL are output to the voltage boosting converter 21.

Right after the start of system operation but before the smoothing capacitor 24 has been sufficiently pre-charged, the conversion voltage control is executed to control the output voltage of the voltage boosting converter 21 so as to decrease the difference ΔVs between the target value Vs* and the detection value Vsf of the system voltage. The smoothing capacitor 24 is, thereafter, sufficiently pre-charged so that the system voltage is quickly controlled to become the target value. During this conversion voltage control, the system voltage control (system voltage stabilization control) by operating the input power of the second MG unit 30 is prohibited. As a result, interference between the system voltage control (system voltage stabilization control) and the system voltage control (conversion voltage control) is restricted. In this case, the P-I controller 69, the voltage boosting drive selection and computation unit 70 and the voltage boosting drive signal computation unit 71 operate as a conversion voltage control means.

(Conversion Power Control)

After the start of system operation and the smoothing capacitor 24 has been sufficiently pre-charged, the motor control unit 37 halts the above conversion voltage control, and changes the operation over to conversion power control to control the output voltage of the voltage boosting converter 21 so as to decrease the difference ΔPi between the command value Pif* and the detection value Pi of electric power output by the boosting converter 21.

When the command value Pif* of electric power output from the boosting converter 21 is to be computed, first, the torque command value T1* and the rotational speed N1 of the first AC motor 13 are input to a first shaft output computation unit 56 to compute a shaft output PD1 of the first AC motor 13. Further, the torque command value T1* and the rotational speed N1 of the first AC motor 13 are input to a first output loss computation unit 57 to compute an output loss PL1 of the first AC motor 13. Thereafter, an adder 58 adds the output loss PL1 to the shaft output PD1 of the first AC motor 13 to compute an input power Pi1 to the first AC motor 13. In this case, when the first AC motor 13 is operating as a generator, the computation result of input power Pi1 to the first AC motor 13 assumes a negative value.

Further, the torque command value T2* and the rotational speed N2 of the second AC motor 14 are input to a second shaft output computation unit 59 to operate a shaft output PD2 of the second AC motor 14. Further, the torque command value T2* and the rotational speed N2 of the second AC motor 14 are input to a second output loss computation unit 60 to compute an output loss PL2 of the second AC motor 14. Thereafter, an adder 61 adds the output loss PL2 to the shaft output PD2 of the second AC motor 14 to compute an input power Pi2 to the second AC motor 14. In this case, when the second AC motor 14 is operating as a generator, the computation result of input power Pi2 to the second AC motor 14 assumes a negative value.

Thereafter, the input power Pi1 to the first AC motor 13 and the input power Pi2 to the second AC motor are added up together through an adder 62 to compute a total electric power Pi*. The total electric power Pi* is input to a second low pass filter 63 (second low frequency component passing means) so as to be subjected to the low pass filtering process permitting the passage of components in a low-frequency region only of the total electric power Pi*. The total electric power Pif* after being subjected to the low pass filtering is regarded to be the command value Pif* for the conversion power. The adder 62 and the second low pass filter 63 operate as conversion power command value computation means.

When a detection value Pi of electric power output from the voltage boosting converter 21 is to be computed, a detection value ic of current output from the voltage boosting converter 21 detected by the current sensor 26 is input to a third low pass filter 64 (third low frequency component passing means) and is subjected to the low pass filtering process permitting the components in the low-frequency region only to pass through in the detection value ic of current output from the voltage boosting converter 21. A conversion power detection unit 65 multiplies the target value Vs* of the system voltage by the detection value icf of current output from the voltage boosting converter 21 after having been subjected to the low pass filtering in order compute a detection value Pi of the conversion power. The detection value Vsf of the system voltage may be multiplied by the detection value icf of the output current to compute the detection value Pi of the output power.

Thereafter, a difference ΔPi between the command value Pif* and the detection value Pi of electric power output from the voltage boosting converter 21 is computed by a subtractor 66. The difference ΔPi is input to a P-I controller 67 (conversion power control amount computation means), and a current duty ratio Dpc of a switching element (not shown) in the voltage boosting converter 21 is computed by P-I control so as to decrease the difference ΔPi between the command value Pif* and the detection value Pi of electric power output from the voltage boosting converter 21.

The current duty ratio Dpc for power control and the current duty ratio Dvc for voltage control are input to the voltage boosting drive selection and computation unit 70, which operates as a selection means. The voltage boosting drive selection and computation unit 70 determines if the ready signal from the main control unit 31 has been received after the start of the system. When it is determined that the ready signal has been received already, it is so determined that the smoothing capacitor 24 has been pre-charged, and the current duty ratio Dpc for power control is selected as a current duty ratio Dc for the switching element in the voltage boosting converter 21 so as to execute the conversion power control by the voltage boosting converter 21.

Dc=Dpc

Thereafter, based on the current duty ratio Dc (=Dpc) for power control, the voltage boosting drive signal computation unit 71 computes voltage boosting drive signals UCU and UCL, and outputs the voltage boosting drive signals UCU and UCL to the voltage boosting converter 21.

After the smoothing capacitor 24 has been pre-charged as described above, the conversion power control is executed to control the electric power output from the voltage boosting converter 21 so as to decrease the difference ΔPi between the command value Pif* and the detection value Pi of electric power output from the voltage boosting converter 21. Thus, the electric power supplied to the power line 22 by the voltage boosting converter 21 can be controlled as desired. In this case, the P-I controller 67, the voltage boosting drive selection and computation unit 70 and the voltage boosting drive signal computation unit 71 operate as a conversion power control means.

Figure 7:
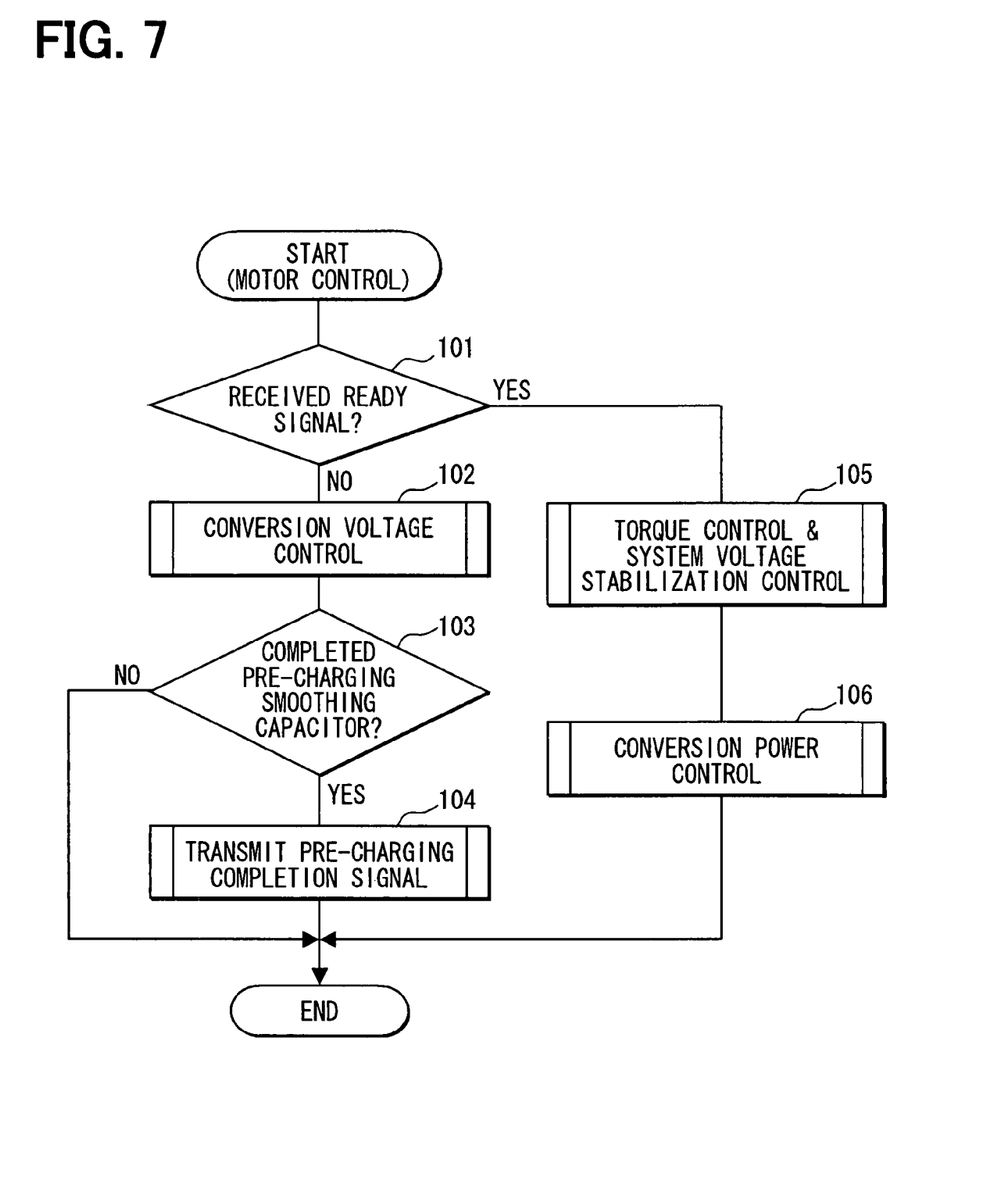
FIG. 7 is a flowchart showing main processing of motor control in the embodiment.

The above motor control (torque control, system voltage stabilization control), conversion voltage control and conversion power control are executed according to a main motor control program shown in FIG. 7. This program is repetitively executed at a predetermined interval after the start of system operation. When the program starts, it is determined at step 101, first, if the ready signal is received from the main control unit 31. When it is determined that the ready signal has not been received, it is so determined that the smoothing capacitor 24 has not been sufficiently pre-charged yet. The routine proceeds to step 102, where the conversion voltage control is executed to so control the output voltage of the voltage boosting converter 21 that the difference ΔVs between the target value Vs* and the detection value Vsf of the system voltage decreases. As a result, the smoothing capacitor 24 is precharged to quickly control the system voltage so as to assume the target value. While the conversion voltage control at step 102 is being executed, the system voltage control (system voltage stabilization control at step 105) by computing the input power to the second MG unit 30 is prohibited.

The routine, thereafter, proceeds to step 103 to determine whether the smoothing capacitor 24 has been sufficiently pre-charged. When it is determined that the pre-charging the smoothing capacitor 24 has been completed (sufficiently pre-charged), the routine proceeds to step 104 where a pre-charge completion signal is transmitted to the main control unit 31.

When it is determined based on the pre-charge completion signal or other signals that the motor control system needs no longer be placed in the shut-down state, the main control unit 31 transmits the ready signal to the motor control unit 37.

Thereafter, when it is determined at step 101 that the ready signal is received from the main control unit 31, it is so determined that the smoothing capacitor 24 has been sufficiently pre-charged. The routine then proceeds to step 105 where the motor control system is no longer placed in the shut-down state, and the motor control (torque control, system voltage stabilization control) is executed. At step 106, the conversion voltage control is changed over to the conversion power control, and the output power of the voltage boosting converter 21 is so controlled as to decrease the difference ΔPi between the command value Pif* and the detection value Pi of the electric power output from the voltage boosting converter 21.

According to the above embodiment, the input power to the second MG unit 30 (second AC motor 14) is so controlled that the difference ΔVs decreases between the target value Vs* and the detection value Vsf of the system voltage to execute the system voltage stabilization control in order to suppress variation in the system voltage of the power supply line 22. Therefore, even when the power balance greatly varies between the two AC motors 13 and 14 due to changes in the operating conditions of the vehicle, the system voltage can be effectively stabilized. Besides, the voltage of the power supply line 22 can be highly stabilized without using the voltage boosting converter 21 of high performance or without using the smoothing capacitor 24 of a large capacity, satisfying the requirement of realizing the system in a small size and at a decreased cost.

In this embodiment, further, the detected motor current vector i2 is separated into a detected current vector it2 for controlling the torque and the detected current vector ip2 for controlling the input electric power, the command voltage vector Vt2* is computed for controlling the torque so that the difference decreases between the command current vector it2* for controlling the torque and the detected current vector it2, and the command voltage vector Vp2* is computed for controlling the input electric power so that the difference decreases between the command current vector ip2* for controlling the input electric power and the detected current vector ip2. Then, the command voltage vector Vt2* for controlling the torque and the command voltage vector Vp2* for controlling the input electric power are computed independently from each other. The final motor command voltage is computed based upon the command voltage vector Vt2* for controlling the torque and on the command voltage vector Vp2* for controlling the input electric power to thereby control the torque of the second AC motor 14 and the electric power input to the second MG unit 30 independently from each other. This prevents the interference between controlling the torque of the second AC motor 14 and controlling the electric power input to the second MG unit 30, and helps stabilize the torque control for the second AC motor 14 and the input electric power control for the second MG unit 30.

In this embodiment, further, right after the start of system operation but before the smoothing capacitor 24 has been sufficiently pre-charged, the conversion voltage control is executed to so control the output voltage of the voltage boosting converter 21 that the difference ΔVs decreases between the target value Vs* and the detection value Vsf of the system voltage. The smoothing capacitor 24 is, thereafter, precharged to quickly control the system voltage so as to assume the desired value. Besides, the power command value (input power operation quantity Pm) for stabilizing the system voltage is prohibited from being instructed to the motor control to thereby prohibit the execution of the system voltage stabilization control. Next, after the smoothing capacitor 24 has been pre-charged, the motor control system is no longer placed in the shut-down state, and the motor control system is released from the shut-down state. Thus, the motor control (torque control, system voltage stabilization control) is started, and the conversion voltage control is changed over to the conversion power control. As a result, the output power of the voltage boosting converter 21 is so controlled that the difference ΔPi decreases between the command value Pif* and the detection value Pi of the electric power output from the voltage boosting converter 21. Thus, the conversion voltage control and the conversion power control are changed over depending upon the conditions of the vehicle. Besides, when the conversion voltage control is being executed, execution of the system voltage stabilization control is prohibited. Therefore, the system voltage can be effectively stabilized without being affected by the conditions of the vehicle.

Further, in the above embodiment, the system controls the second AC motor 14 by the sinusoidal wave PWM control method, wherein, in stabilizing the system voltage, the current vector is so controlled as to vary only the reactive power that does not contribute to producing the torque of the second AC motor 14 to thereby control the system voltage by controlling the input power to the second AC motor 14, while maintaining the torque of the second AC motor 14 constant (at the torque command value T2*). Therefore, variation in the system voltage can be suppressed without adversely affecting the operating condition of the vehicle.

In this embodiment, further, the input power operation quantity Pm for the second AC motor 14 is computed by using the detection value Vsf of system voltage after having been subjected to the low pass filtering. At the time of computing the input power operation quantity Pm, therefore, the detection value Vsf of system voltage can be used after the noise components (high-frequency components) included in the detection value Vs of system voltage have been removed through low pass filtering, and the accuracy in computing the input power operation quantity Pm can be improved.

According to this embodiment, the command value Pif* for the conversion power is computed from the total electric power Pi* obtained by adding up the power Pi1 input to the first AC motor 13 and the power Pi2 input to the second AC motor. Further, the target value Vs* (or detection value Vsf) of the system voltage is multiplied by the detection value icf of the current output from the voltage boosting converter 21 to compute the detection value Pi of the conversion power. Further, the electric power output from the voltage boosting converter 21 is so controlled as to decrease the difference ΔPi between the command value Pif* and the detection value Pi of the conversion electric power. When the conversion power control is to be executed, the system voltage control (system voltage stabilization control) by operating the electric power input to the second MG unit 30 is prohibited. Thus, the electric power supplied to the power supply line 22 can be controlled as desired, the system voltage can be stabilized, reducing the burden on the conversion of power caused by the system voltage control (system voltage stabilization control) by operating the electric power input to the second MG unit 30.

In this embodiment, further, the total power Pif* after the total power Pi* of power Pi1 input to the first AC motor 13 and power Pi2 input to the second AC motor is subjected to the low pass filtering process, is used as the command value Pif* for the conversion power. Therefore, the total electric power Pif* after the noise components (high-frequency components) are removed by low pass filtering can be used as the command value Pif* for the conversion power, making it possible to accurately set the command value Pif* for the conversion power. Besides, upon limiting the frequency band, the voltage boosting converter 21 can be prevented from operating at high speeds, and the voltage boosting converter 21 of low performance having a small size can be used, which is advantageous for being mounted on a vehicle.

In this embodiment, further, the detection value Pi of conversion power is operated by using the detection value icf of current output from the voltage boosting converter 21 after having been subjected to the low pass filtering. In computing the detection value Pi of conversion power, therefore, there can be used the detection value icf of output current after noise components (high-frequency components) included in the detection value ic of output current have been removed by low pass filtering to improve accuracy for operating the detection value Pi of conversion power.

At the start of the electric vehicle, further, the system voltage, usually, starts with zero. A predetermined target voltage must be attained to complete the start. In this case, the MG unit 30 has been shut down in the initial stage of start, and the system voltage stabilization cannot be executed by using the MG unit 30. To cope with this, at the start of the electric vehicle, this embodiment does not execute the conversion power control but executes the conversion voltage control, instead, while prohibiting the system voltage control (system voltage stabilization control) which is based on operating the electric power input to the MG unit 30. This prevents the system voltage control (system voltage stabilization control) based on the operation of power input to the MG unit 30 from interfering with the system voltage control (conversion power control) by the voltage boosting converter 21, and makes it possible to effectively stabilize the system voltage and to smoothly start the electric vehicle.

After the start of the electric vehicle, the MG unit 30 may often be overheated due to abnormal condition in the cooling system while the electric vehicle is traveling. In this case, the MG unit 30 may often be shut down to protect the MG unit 30. In this case, therefore, the system voltage stabilization cannot be executed by using the MG unit 30.

To cope with this, therefore, in case the MG unit 30 is overheated due to abnormal condition in the cooling system while the electric vehicle is traveling, this embodiment does not execute the conversion power control but executes the conversion voltage control, instead, while prohibiting the system voltage control (system voltage stabilization control) which is based on the operation of electric power input to the MG unit 30. Thus, the system voltage is controlled by controlling the voltage by using the voltage boosting converter 21, the system voltage is effectively stabilized, the system voltage is prevented from becoming excessive, and the MG unit 30 and the like are reliably protected.

In the above embodiment, the AC motors are controlled by the sinusoidal PWM control method. However, the system may control the AC motors based on any other control systems (e.g., rectangular wave control system).

In the above embodiment, further, the electric power output from the voltage boosting converter 21 is so controlled as to decrease the difference ΔPi between the command value Pif* and the detection value Pi of electric power output from the voltage boosting converter 21 at the time of controlling the conversion electric power. However, it is also possible to so control the electric power input to the voltage boosting converter 21 as to decrease the difference ΔPi between the command value Pif* and the detection value Pi of electric power input to the voltage boosting converter 21.

In the above embodiment, further, the electric power input to the second MG unit 30 (second AC motor 14) is controlled to suppress variation in the system voltage at the time of the system voltage stabilization control operation. However, variation in the system voltage may be suppressed by controlling the electric power input to the first MG unit 29 (first AC motor 13). Alternatively, in a vehicle of the all-wheel-drive constitution mounting a third MG unit on the driven wheels, variation in the system voltage may be suppressed by controlling the electric power input to the third MG unit.

The above embodiment is directed to a hybrid vehicle of the so-called split type, which splits the motive power of the engine through the planetary gear mechanism. Not being limited to the hybrid vehicle of the split type, however, the embodiment may be hybrid vehicles of other types, such as a parallel type and a series type. In the above embodiment, further, the vehicle uses the AC motor and the engine as motive power sources. However, the vehicle may use the AC motor only as a motive power source. The vehicle may have only one MG unit comprising an inverter and an AC motor, or three or more MG units.

What is claimed is:
1. A control apparatus for an electric vehicle comprising:
a conversion means that converts a voltage supplied by a DC power supply into a system voltage appearing on a power supply line;
an MG unit that includes an inverter connected to the power supply line and drives an AC motor;
a current control means for controlling a torque of the AC motor and an input electric power to the MG unit independently from each other;
a system voltage control means for executing a system voltage stabilization control to control an electric power input to the MG unit so as to suppress variation in the system voltage by sending a command value for controlling the input electric power to the current control means;
a conversion power control means for executing a conversion power control to control a conversion power, which is an input electric power or an output power of the converter means from the converter means;
a conversion voltage control means for executing a conversion voltage control to control the voltage output from the converter means; and
a selection means for selecting execution of either the conversion power control or the conversion voltage con- trol, and for inhibiting execution of the system voltage stabilization control when the conversion voltage control is selected.

2. The control apparatus according to claim 1, wherein the current control means computes a motor command voltage, which is a command value of voltage to be applied to the AC motor, based upon a command voltage for controlling the torque of the AC motor and a command voltage for controlling the input electric power to the MG unit.

3. The control apparatus according to claim 2, wherein:
the current control means includes a current separation means for separating a detected motor current, which is a detected value of electric current flowing into the AC motor, into a detected current for torque control related to controlling the torque of the AC motor and a detected current for input electric power control related to controlling the input electric power to the MG unit; and
the current control means computes a command voltage for torque control based on the command current for controlling the torque of the AC motor and on the detected current for controlling the torque, and further computes the command voltage for controlling the input electric power based on the command current for controlling the input electric power to the MG unit and on the detected current for controlling the input electric power.

4. The control apparatus according to claim 3, wherein the current separation means computes a detected current for controlling the torque based on the motor command voltage, the detected motor current and the command voltage for controlling the torque.

5. The control apparatus according to claim 3, wherein the current separation means computes a detected current for controlling the input electric power based on the motor command voltage, the detected motor current and the command voltage for controlling the input electric power.

6. The control apparatus according to claim 1, further comprising:
a target voltage-setting means for setting a target value of the system voltage; and
a voltage detection means for detecting the system voltage, wherein the system voltage control means computes the input electric power operation amount for the MG unit based on the target value of system voltage set by the target voltage-setting means and on the system voltage detected by the voltage detection means, and sends a command value for controlling the input electric power to the current control means based on the input electric power operation amount to thereby control the system voltage.

7. The control apparatus according to claim 6, further comprising:
a low-pass means for permitting passage of components lower than a predetermined frequency of the system voltage detected by the voltage detection means,
wherein the system voltage control means computes an input electric power operation amount to the MG unit by using a system voltage of lower than the predetermined frequency that has passed through the low-pass means.

8. The control apparatus according to claim 1, further comprising:
a conversion power command value computation means for computing a command value for the conversion power; and a conversion power detection means for detecting the conversion power,
wherein the conversion power control means computes a control amount for the conversion power based on the command value for the conversion power computed by the conversion power command value computation means and on the conversion power detected by the conversion power detection means, and controls the conversion power based on the control amount for the conversion power.

9. The control apparatus according to claim 8, wherein the conversion power command value computation means computes a command value for the conversion power based on an electric power input to all electric loads inclusive of the MG unit connected to the power supply line.

10. The control apparatus according to claim 9, further comprising:
a low-pass means for permitting passage of components lower than a predetermined frequency of the electric power input to all electric loads inclusive of the MG unit connected to the power supply line, wherein the conversion power command value computation means computes a command value for the conversion power based on an electric power of lower than the predetermined frequency that has passed through the low-pass means.

11. The control apparatus according to claim 8, further comprising:
at least either one of a target voltage-setting means for setting a target value of the system voltage or a voltage detection means for detecting the system voltage; and
a current detection means for detecting an output current of the converter means,
wherein the conversion power detection means computes the conversion power based on the target value of the system voltage set by the target voltage-setting means or a system voltage detected by the voltage detection means and the output current of the converter means detected by the current detection means.

12. The control apparatus according to claim 11, further comprising:
a low-pass means for permitting passage of components lower than a predetermined frequency of the output current of the converter means detected by the current detection means,
wherein the conversion power detection means computes the conversion power by using an output current lower than the predetermined frequency that has passed through the low-pass means.

13. The control apparatus according to claim 1, further comprising:
a target voltage-setting means for setting a target value of the system voltage; and
a voltage detection means for detecting the system voltage,
wherein the conversion voltage control means computes the amount of controlling the output voltage of the converter means based on the target value of the system voltage set by the target voltage-setting means and the system voltage detected by the voltage detection means, and controls the output voltage of the converter means based on the amount of controlling the output voltage.

* * * * *